July 12, 1949. E. BUGATTI 2,476,081
MOVEMENT AMPLIFYING MEANS
Filed Sept. 19, 1945 2 Sheets-Sheet 1
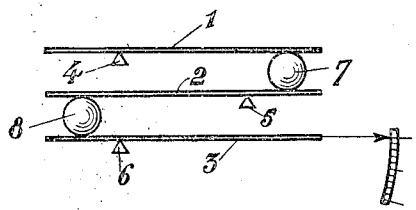
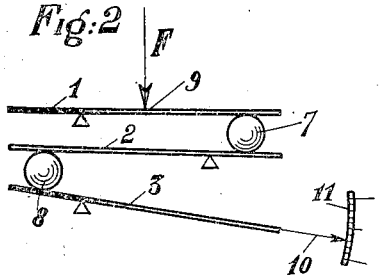
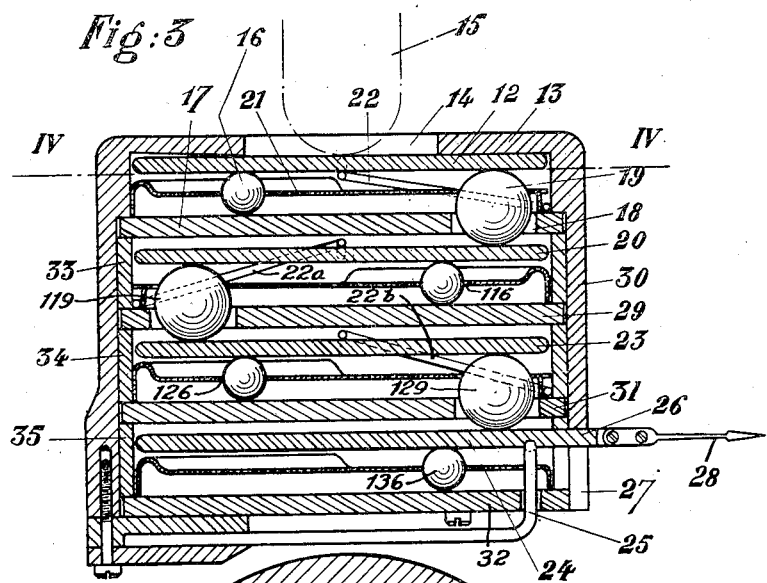
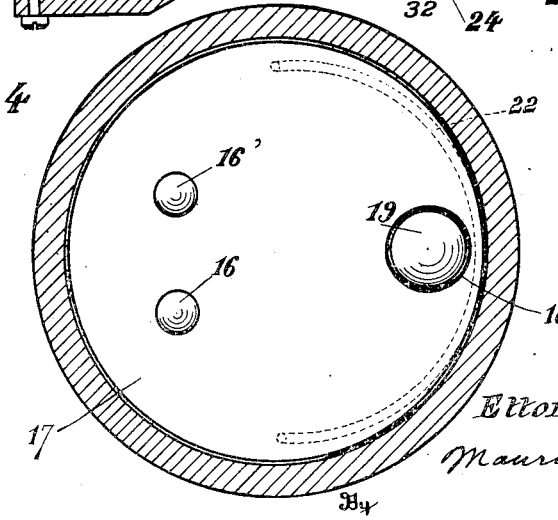
Inventor
Ettore Bugatti
By Mauro & Lewis
Attorneys July 12, 1949.   E. BUGATTI   2,476,081
MOVEMENT AMPLIFYING MEANS
Filed Sept. 19, 1945   2 Sheets-Sheet 2
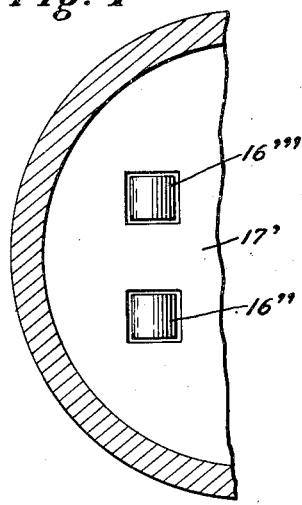
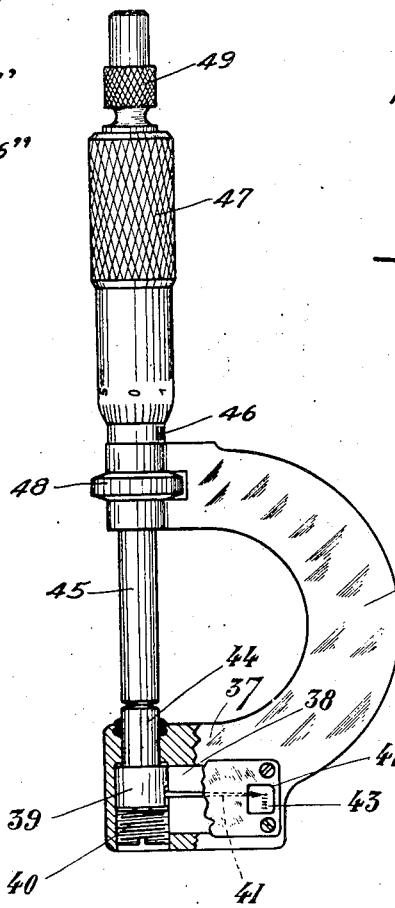
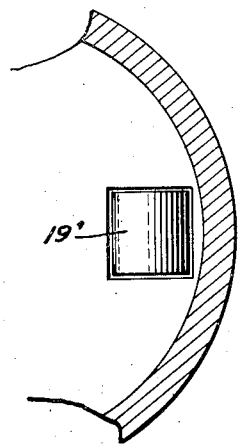
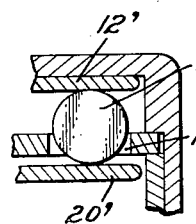
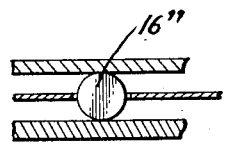
Inventor
Ettore Bugatti
By Mauro & Lewis
Attorneys Patented July 12, 1949

2,476,081

UNITED STATES PATENT OFFICE 2,476,081

MOVEMENT AMPLIFYING MEANS

Ettore Bugatti, Paris, France

Application September 19, 1945, Serial No. 617,382
In France May 19, 1941

Section 1, Public Law 690, August 8, 1946
Patent expires May 19, 1961

6 Claims. (Cl. 74—96)

Mechanical devices for amplifying movement are based as a rule on the principle of lever. Where one lever is used, the device is cumbersome if a large amplification power has been provided. Should a lever having a large amplification power be split into a series of small levers, suitably grouped to meet predetermined space conditions, a difficulty arises: a number of joints are introduced, each joint is liable to work loose in the long run and the precision of the amplifier eventually leaves much to be desired especially after some time of use. Where minute movements are to be made perceptible, the component parts of the amplifier should be manufactured with much care and are particularly susceptible to shocks and other sources of damages.

It is a primary object of my invention to provide movement amplifying means devised to do away with the difficulties above set forth.

One of the features of my invention lies in the use of balls or rollers as fulcrums between a movement amplifying lever and the support therefor, and also in the use, combined or not with the first named use, of balls or rollers operating as movement transmission means between two amplifying levers.

Another feature of my invention lies in the construction of levers in a movement amplifier, as plates, preferably circular plates, which are piled up in a casing or a hollow part forming a housing and, as the case may be, constituting a guide for said plates. Owing to the foregoing arrangement, it is possible to obtain an amplifier constituting a portable, compact instrument which can be readily put into service by contacting the member whose movements are desired to be observed, with the outermost plate, or a key protruding from the casing and operating the plates.

In an embodiment of my invention, the movement amplifier comprises spaced apart stationary plates, which provide a support for fulcrums of movable plates playing the part of amplifying levers and positioned in alternate relationship with respect to the stationary plates, the latter being apertured locally to allow the movement transmitting means to pass therethrough.

The fulcrums for the movable plates are constructed in any suitable manner; they may be knives which may be solid with the movable plates or the stationary plates. However, my invention more particularly comprises the use as fulcrums, of rollers or preferably balls, at least two in number, which are interposed between a movable plate and a stationary plate, and are held for instance in cages.

The combination of plates is preferably completed by biassing means, for instance resilient members such as pads or springs, to provide for permanent contact between the levers and the parts acting as fulcrums and transmitting means. In the preferred construction, I place the whole in a casing such as a cylindrical barrel, the component parts being preferably adapted so that they can be introduced into the barrel each one in its turn.

A pointer movable in front of a scale may be associated with the movable plate which gives the largest amplification, so that the movements can be read, for instance through a window in the casing or barrel.

Amongst various applications to which the above amplifying means may be designed, I especially will mention its application to precision instruments, inter alia measurement instruments.

One knows that it is difficult to ascertain the precise time at which a movable member contacts an object when brought near the same; unless the object is made of an extremely hard matter, it frequently happens that said object is slightly crushed by reason of the strain exerted for displacing said member; in the case of a measurement apparatus, the readings are made false and moreover depend upon the skill of the operator. It will be thus understood that a movement amplifier giving objective indications provided it is sufficiently sensitive and reliable throughout its time of use, is highly desirable.

My invention further comprises the use of movement amplifying means as above described in combination with precision devices, especially measurement instruments, particularly by providing in such apparatus, a hollow part or supports for housing or attaching said means.

In order that the nature of this invention can be best understood, I shall describe a specific embodiment thereof solely by way of example; in said embodiment, the above features are grouped and the amplifying means are assumed to be applied to a micrometer calliper.

Figs. 1 and 2 are diagrammatic views illustrating the principle of my invention.

Fig. 3 is a diagrammatic axial cross-section of a movement amplifying means in accordance with my invention.

Figs. 3' and 3" are detail views showing fragments of the means illustrated on Fig. 3, according to modified forms.

Fig. 4 is a horizontal cross-section taken along line IV—IV on Fig. 3.

Figs. 4' and 4'' are detail views corresponding to portions of Fig. 4 and representing the modifications shown on Figs. 3' and 3'' respectively, in the same conditions as on Fig. 4.

Fig. 5 shows an improved micrometer-calliper embodying said invention, with parts broken away.

Figs. 1 and 2 show a construction diagram for movement amplifying means in which the levers are arranged in tiers; by way of simplification, I have shown only three plates 1, 2, 3. The pivots are assumed to be knives 4, 5, 6, and transmission parts are shown as balls 7, 8 interposed between said plates. When plate 1 is moved by a force applied at 9 in the direction of arrow F, ball 7 is moved by an amount proportional to the leverage; an amplified motion is imparted to plate 2, the left hand end of which is moved likewise by a magnified amount; again, through ball 8, the right hand end of plate 3 is given a still amplified motion, the extent of which is readable on scale 11 opposite pointer 10.

Where my apparatus shall operate in upright position, assuming that masses are properly selected in consideration of the leverages, the plates are biassed by gravity into permanent contact with the balls which shall be assumed to be suitably guided.

Figs. 4' and 4'' are detail views corresponding to portions of Fig. 4 and representing the modifications shown on Figs. 3' and 3'' respectively, in the same conditions as on Fig. 4.

In the embodiment shown on Figs. 3 and 4, the plates, four in number in this example, are circular and they are set in a casing or barrel 30. The uppermost movable plate 12, in abutting relationship with flange 13 defining an aperture 14 to accommodate member 15, the movements of which are to be amplified, rests upon two small balls 16 (Fig. 4) themselves lying on a stationary plate 17; plate 17 has an aperture 18 to accommodate a large ball 19 acting as transmission means and resting on the next movable plate 20. The three balls are held in a cage 21 which has the shape of an inverted shallow cup or dished member placed in inverted position, and is secured against any rotation movement by any suitable means. A spring 22 taking its bearing on stationary plate 17 urges movable plate 12 upwards.

As shown on Figs. 3' and 4', a roller 19' may be substituted for each ball 19, the adjacent parts in the device being designated by the same reference characters as the corresponding parts on Figs. 3 and 4 but with a prime; likewise, rollers 16'', 16''' (Figs. 3'' and 4'') may be substituted for balls 16 and 16', or again knives such as 4 (Fig. 1) may be substituted for balls 16, 16'.

The other movable plates 20, 23, 24 are arranged similarly, plate 20 being urged downwardly by spring 22a, while plate 23 is urged upwardly by spring 22b the lowermost plate 24 which is urged by spring 25, has a tail portion 26 protruding out of casing 30 through a slot 27; a pointer similar to pointer 11 (Figs. 1 and 2) has been shown at 28. The stationary plates 17, 29, 31, 32 are properly spaced apart by rings 33, 34, 35 and it is to be remarked that owing to the construction shown, all parts can be introduced into the barrel through its bottom aperture, each one in its turn.

It will readily be seen that the lowermost movable plate 26 rests on the lowermost balls 136 and spring 25; plate 23 rests on balls 126 and 129, and under spring 22b; plate 20 rests on balls 116 and 119 while being engaged by spring 22a; and plate 12 rests on balls 16 and 19, and spring 22.

In operation, let us assume that member 15 is moved downwardly by a small amount; plate 12 is thus rocked clockwise about the plate fulcrums or balls 16, and ball 19 is thus moved downwardly by a larger extent than member 15; in so doing, ball 19 causes plate 20 to rock counterclockwise about plate fulcrums 116, against the biassing force from spring 22a; hence ball 119 is free to move upwardly, to remain in contact with plate 20; now ball 119 is urged upwardly by spring 22b tending to rock plate 23 clockwise about fulcrums 126, and thereby causing ball 129 to move downwardly; in such a movement, ball 129 causes plate 24 to rock clockwise about balls 136 against the resilient bias from spring 25, and carry pointer 28 around.

It will be noticed that the actions of two successive springs are in opposition (for example spring 22a tends to move ball 119 downwardly, while spring 22b tends to move said ball upwardly; likewise spring 22b tends to move ball 129 downwardly while spring 25 tends to move it upwardly) so that as a whole the opposite force to be overcome by member 15 for moving the combination of plates can be made very slight by properly choosing the spring forces and the weights of parts.

In the micrometer-calliper shown in Fig. 5, the lower end 37 of the swan-neck 36 has an inner housing 38; the movement amplifying means 39 are accommodated in a tubular part of said housing and held by a screw 40; the pointer 41 moves behind a window 42 opposite a scale 43. Instead of a stationary anvil or abutment member as in conventional types of micrometer, the calliper has a slidable plunger 44 which acts like member 15 on Fig. 3, upon the movable plates in the amplifying means.

The micrometer illustrated is of a conventional type and comprises a long spindle 45 which passes through and has a screw-thread operative engagement with a nut 46 attached to the swan-neck or yoke 36; spindle 45 is turned by means of either an operating thimble 47 or an operating head 49 which protrudes from the outer end of thimble 47 and is frictionally coupled with spindle 45, as is well-known in the art; 48 designates a locking ring enabling of locking spindle 45 in an adjustment position.

While I have illustrated and described a preferred embodiment of my invention, I do not wish to be limited thereby, the scope of my invention being best set forth in the following claims.

What I claim is:

1. In a device of the type described, the combination of a casing; a plate set in a stationary position in said casing, having an aperture adjacent to the wall of the casing; a movable plate; means, including a fulcrum below said stationary plate at a larger distance from the casing wall than the aperture, for supporting the movable plate from the casing; a second fulcrum on the stationary plate at a point remote from the aperture; a second movable plate in the casing, positioned to rest on the second fulcrum; and motion transmitting means passing through said aperture, operatively interposed between the movable plates and providing an additional support for the second movable plate.

2. In a device of the type described, the combination of a casing; a plate set in a stationary position in said casing, having an aperture adjacent to the wall of said casing; a movable plate in the casing, below said stationary plate; means below the stationary plate, including a fulcrum at a larger distance from the casing wall than the aperture, for supporting the movable plate from the casing; a ball on the stationary plate at a point remote from the aperture, a second movable plate in the casing, positioned to rest on said ball; and motion transmitting means operatively interposed between the movable plates, passing through said aperture and providing an additional support for the second movable plate.

3. The combination of claim 1, the motion transmitting means including a ball interposed between the movable plates and freely passing through the aperture in the stationary plate.

4. The combination of claim 1, further comprising resilient means, supported from the casing, to urge each movable plate into contact with the corresponding fulcrum and motion transmitting means.

5. In a device of the type described, the combination of a casing; a plate set in a stationary position in said casing, having an aperture adjacent to the wall of the casing; a movable plate in the casing, below said stationary plate; means below the stationary plate, including a fulcrum at a larger distance from the casing than the aperture, for supporting the movable plate from the casing; a dished member placed in inverted position on the stationary plate, having two spaced apart apertures, one of which is positioned to register with the aperture in the stationary plate; a second movable plate in the casing above said dished member; motion transmitting means passing through the registering apertures in the stationary plate and the dished member, operatively interposed between the movable plate and providing a support for the second movable plate; and a ball between the stationary plate and the dished member, passing through the other aperture in said dished member, to provide a further support for the second movable plate.

6. In a device of the type described, the combination of an open-ended casing; a plurality of spaced apart, parallel stationary plates in said casing, each of which has an aperture, the apertures being positioned in staggered relationship; a plurality of spacers, each of which is interposed between two adjacent stationary plates, to hold the same in parallel position; a plurality of movable plates, each of which is loosely positioned between two adjacent stationary plates; a motion transmitting member separate from and interposed between two adjacent movable plates, said member passing through the aperture in the intermediate stationary plate; a fulcrum device between each movable plate and the next underlying stationary plate at a point remote from the aperture in the latter, to support the movable plate from said underlying stationary plate; and means at both ends of the casing, for closing the same, one of which is adapted to provide a support for the adjacent spacer and movable plate, at least one of said means being removably secured to the casing.

ETTORE BUGATTI.

REFERENCES CITED

The following references are of record in the file of this patent:

UNITED STATES PATENTS

| Number | Name | Date |
|---|---|---|
| 748,024 | Stevens | Dec. 29, 1903 |
| 1,162,276 | Yoran | Nov. 30, 1915 |
| 1,218,771 | Hoeschen | Mar. 13, 1917 |
| 1,290,434 | Walter | Jan. 7, 1919 |
| 1,561,630 | Wilson | Nov. 17, 1925 |
| 2,029,665 | Markowicz | Feb. 4, 1936 |
| 2,087,885 | Fleischel | July 27, 1937 |
| 2,378,093 | Monies | June 12, 1945 |